Sept. 9, 1969    V. AYLIKCI ET AL    3,466,518
ROTARY STEPPING MOTORS AND CONTROL SYSTEMS THEREFOR
Filed April 24, 1968    8 Sheets-Sheet 1
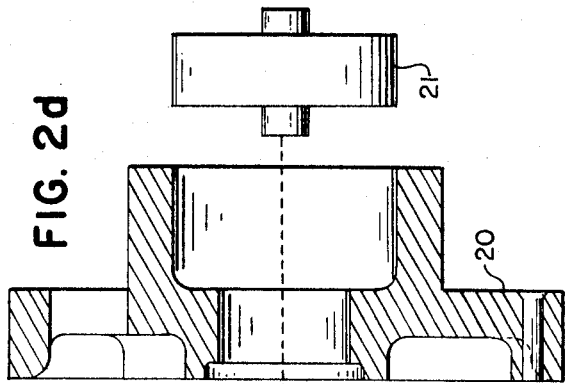
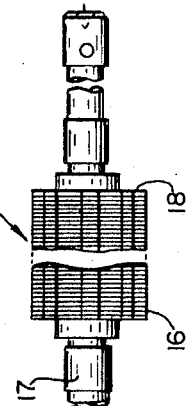
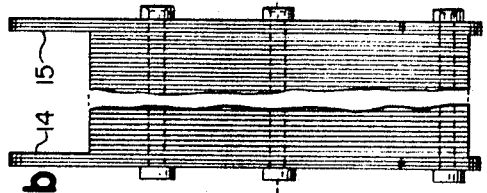
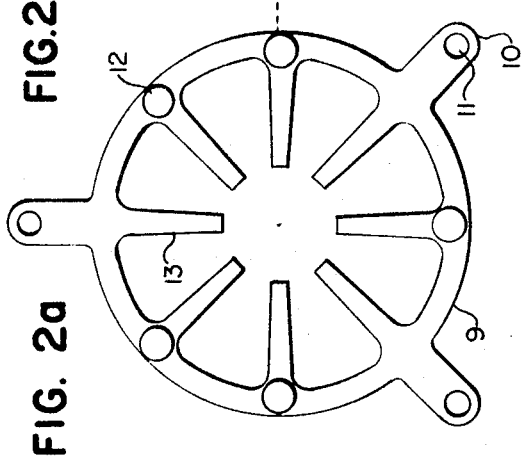
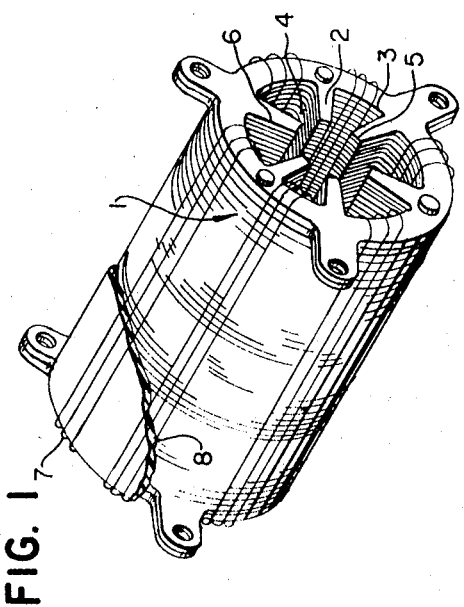
INVENTORS
VELI AYLIKCI &
HARVEY J. ROSENER
BY
THEIR ATTORNEYS Sept. 9, 1969   V. AYLIKCI ET AL   3,466,518
ROTARY STEPPING MOTORS AND CONTROL SYSTEMS THEREFOR
Filed April 24, 1968   8 Sheets-Sheet 2

INVENTORS
VELI AYLIKCI &
HARVEY J. ROSENER

BY Louis A. Kline

John J. Callahan

THEIR ATTORNEYS

INVENTORS
VELI AYLIKCI &
HARVEY J. ROSENER

BY

THEIR ATTORNEYS

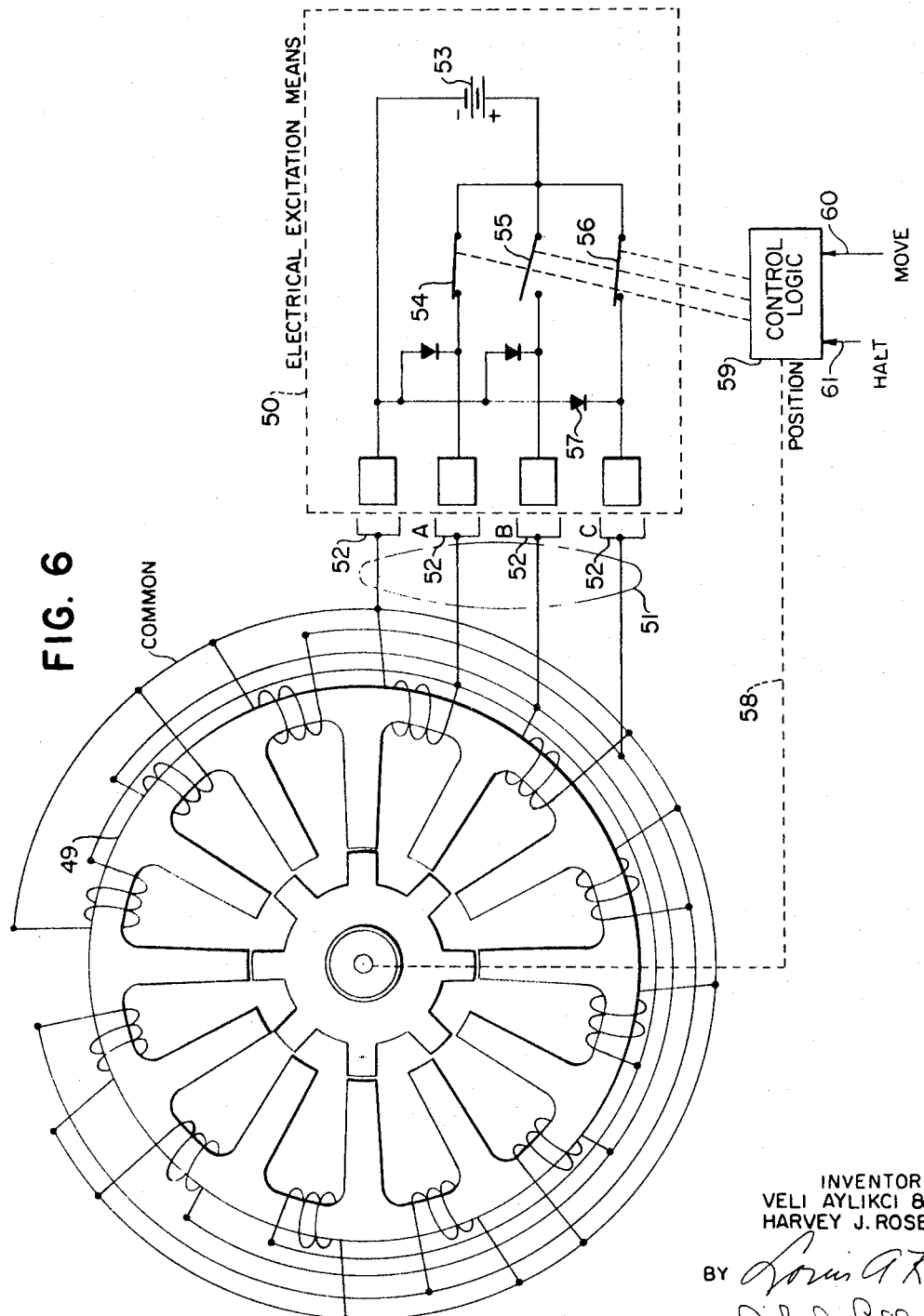

Sept. 9, 1969  V. AYLIKCI ET AL  3,466,518
ROTARY STEPPING MOTORS AND CONTROL SYSTEMS THEREFOR
Filed April 24, 1968  8 Sheets-Sheet 5

INVENTORS
VELI AYLIKCI &
HARVEY J. ROSENER
BY *Louis A. Kline*
*John J. Callahan*
THEIR ATTORNEYS

INVENTORS
VELI AYLIKCI &
HARVEY J. ROSENER

THEIR ATTORNEYS

FIG. 9

United States Patent Office

3,466,518
Patented Sept. 9, 1969

3,466,518
ROTARY STEPPING MOTORS AND CONTROL SYSTEMS THEREFOR
Veli Aylikci, Bellbrook, and Harvey J. Rosener, Torrance, Ohio, assignors to The National Cash Register Company, Dayton, Ohio, a corporation of Maryland
Filed Apr. 24, 1968, Ser. No. 723,775
Int. Cl. H02k 29/02
U.S. Cl. 318—138                                15 Claims

ABSTRACT OF THE DISCLOSURE

A rotary stepping motor system employing selective winding excitation means and a stepping motor having electrical windings placed on the stator yoke between the stator teeth axially encircling the yoke in toroidal fashion; in the excitation means, sequentially-designated switching members are activated to excite the stator windings selectively; selective winding excitation is used to produce a movable sequence of stator poles that induce rotor rotation; selective excitation in generating a stator pole causes magnetomotive force from a plurality of windings to combine and to produce a magnetic flux and causes two such magnetic fluxes to combine in forming a magnetic pole.

CROSS-REFERENCE TO RELATED APPLICATION

The present stepping motor system may be combined with the electronic control system described in copending United States patent application Ser. No. 611,622, filed Jan. 25, 1967, in the names of Veli Aylikci and Donald R. Doering and assigned to the same assignee as the present application.

BACKGROUND OF THE INVENTION

Field of the invention

This invention pertains to electric motors of the incremental, discrete position stepping type that are excited through an array of switching devices.

Description of the prior art

The stator structure of prior-art, conventional stepping motors severely limits the mode of excitation that may be employed with the motor. These conventional motor stators may be placed into one of two classes:

(1) Those employing salient poles with electrical windings placed on the pole structure;
(2) Those composed of discrete segments with each segment carrying a set of electrical windings.

Stepping motors of the first type, those which employ salient pole windings, have some inherent features, in addition to excitation, which limit their application; among these are high cost of manufacture, difficult cooling of the electrical windings, lack of flexibility in adapting a single basic design to multiple load conditions, a low practical limit on the number of incorporatable stator poles, and inability to place large numbers of winding turns in the motor.

Stepping motors of the second type with stators of the segmented variety are typified by the motor disclosed in United States Patent No. 3,344,325, issued Sept. 26, 1967, on the application of Morton Sklaroff. Although motors of that type represent an improvement over the prior art, they too are faced with inherent limitations in excitation and in some applications. Among the disadvantages of that motor are the need for costly precision operations during manufacture and assembly; the difficulty of obtaining precise accurate rotor position detents, the need for a complex and costly stator mounting frame, the need to employ special machines for winding the stator segments, the need to employ a large number of rotor and stator poles to realize small rotor position increments, the necessity of incorporating a magnetic rotor, the need for an even number of both rotor and stator poles, and the necessity of reversing winding current flow between rotor steps.

The present invention improves upon the stepping motor art and eliminates disadvantages mentioned for both the above classes of motor through the use of toroidally-placed windings and a unitary stator structure that permits excitation of windings in a completely flexible and cooperating manner.

The unitary stator and toroidal windings as used in the present stepping motor have been applied in prior-art devices to electrical machines outside the stepping motor art; those prior-art machines are typified by United States Patents No. 2,935,630, issued May 3, 1960, on the application of George L. Jones and George H. Bateman, for an induction-hysteresis motor device; No. 3,187,211, issued June 1, 1965, on the application of Dan L. Ve Nard, for a resolver transducer device; and No. 3,317,765, issued May 2, 1967, on the application of William H. Cone, for an electrical generating device. Although each of those machines employs a unitary stator with toroidal windings thereon, a device other than a stepping motor is realized, and, more important, and in contrast to the present invention, the windings are connected into a network which is non-selectively attached to an external power device; that is, none of those inventions incorporate a means to change the relation between an external power device and an individual winding in response to command.

Each of the non-stepping motor prior-art devices which incorporates a unitary stator and toroidal windings is also structurally distinct from the stepping motor of the present invention by the relative size of rotor and stator poles and the relation between number of rotor and stator poles.

SUMMARY

Winding energization in the present stepping motor system is accomplished in a manner contrasting with that possible in prior-art stepping motor systems. In the present invention, each toroidal, yoke-mounted winding is connected selectively for a precise period to the energy source. This connection is accomplished in a manner causing a sequence of moving stator poles. Selective excitation also causes the magnetomotive force from one winding to combine with that from other similarly excited windings located nearby on the stator yoke. The combined magnetomotive forces from these windings are used to generate a magnetic flux, and this flux is in turn caused to combine with similarly-produced flux from other windings in producing a magnetic pole.

It is therefore an object of this invention to provide a novel practical means for connecting and exciting toroidal stepping motor windings, a means which not only enables such windings to be successfully employed but also causes the motor employing such windings to be improved over conventional motors.

Further objects of this invention relate to the stepping motor improvements which arise from toroidal windings and their decreased space requirements between the motor stator tooth members. Among these benefits are a motor which is easier and less expensive to manufacture and easier to cool, and a stator which is not dimensionally restricted by a large winding bundle.

BRIEF DESCRIPTION OF THE DRAWINGS

FIGURE 1 is an oblique view of the stator portion of a motor constructed according to the present invention.

FIGURES 2a through 2d show an exploded view of a motor constructed according to the present invention, showing its mechanical construction details.

FIGURE 6 is an electrical schematic typically showing both the stepping motor and the excitation means and the manner of interconnecting these two parts in the present invention.

FIGURE 9 is a winding energization chart for the motor shown in FIGURE 8a.

DESCRIPTION OF THE PREFERRED EMBODIMENT

Figure 3:
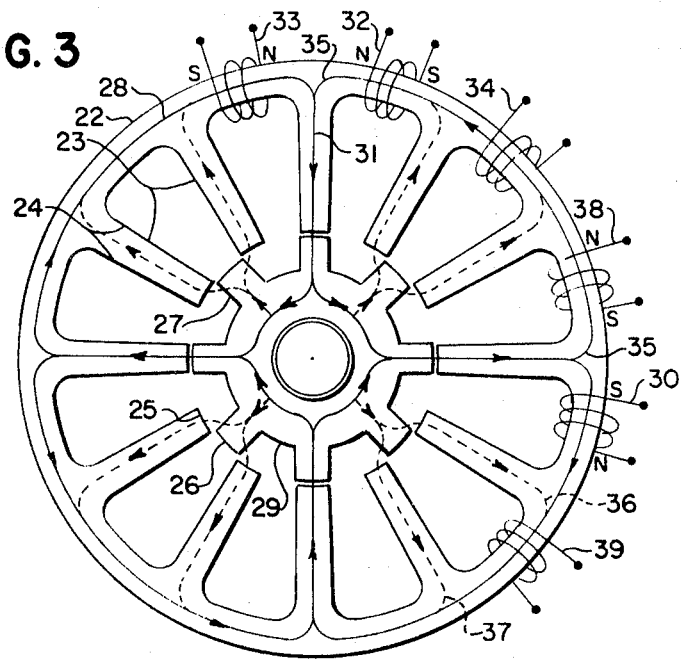
FIGURE 3 is an end view of a motor constructed according to the present invention, showing magnetic flux patterns during quiescence.

Referring to FIGURE 1 of the drawings, there is shown an oblique view of a stepping motor stator made according to the present invention. This stator is composed of a stack of laminations 1, each having a unitary ring structure with inwardly-directed pole members 2, and with the pole members at their attached end separated by yoke portions 3 of the unitary rings. The innermost ends of the pole members are separated by an air gap 4. The innermost ends of the pole members are shaped in a contour which mates with that of the rotor member of the motor, as is shown at 5. The length of each stator pole is shown as 6 in FIGURE 1. This length is important in considering the flexibility of the present invention, as will be explained in a later portion of this specification.

Electrical windings are placed on the yoke portions of the unitary ring stator structure between the pole members, as shown at 7 in FIGURE 1. Individual turns of these windings are insulated from each other by insulating material placed upon the wire. They are also insulated from the stator structure by an insulation coating, 8, placed on the stator structure.

The stator assembly shown in FIGURE 1 has a total of six stator poles. This relatively low number of poles is selected for illustration in FIGURE 1, since it permits easy viewing of the component parts of the stator. As will be described later in the specification, the scope of the present invention is not limited to a six-pole stator in the stepping motor but extends to many other pole configurations, a twelve-pole stator, as shown in the later drawings, having special merit.

Winding leads are not shown terminated in FIGURE 1; termination of leads and their connection to the excitation source are a topic covered in later discussion of the invention.

Referring to FIGURES 2a–2d of the drawings, another view of a stepping motor portion of the present invention is shown. FIGURE 2 may be regarded as an exploded view of such a stepping motor. In this drawing, there is shown the full and practical shape of the stator laminations 9 with the mounting ears 10 and the mounting holes 11, which are not depicted in the other, more functional, drawings of this specification. Also shown in FIGURE 2 are the members 12 used to fasten the laminations into a unitary bundle.

As shown in FIGURE 2b at 14 and 15, the mounting ears for the stator lamination stack do not extend the entire length of the stack but are restricted to the ends of the stack, so that shunting of the magnetic path or eddy currents are reduced when the assembly is placed in its housing.

The third member shown in FIGURE 2c is the rotor 19 of the motor. As shown in this drawing, the rotor is also composed of a stack of individual laminations 16 assembled into a group and mounted on a shaft 17. The poles 18 of the rotor 19 are of the salient protruding discrete type, as are the poles of the stator 13. Salient poles are contrasted with the distributed poles often employed in an induction motor.

Also shown in FIGURE 2 are an end cap and bearing 20 and 21, respectively, which are parts of the motor. The end cap 20 is made of aluminum die casting or other suitable material. The bearing 21 is of the ball type or any other suitable bearing.

Magnetic parts of the motor such as the stator 9 and the rotor 19 are made of magnetic silicon alloy steel such as American Iron and Steel Institute (AISI) type M19 and M15 or any other suitable material.

An essential part of this invention concerns the method for making the electrical windings shown in FIGURE 1 and located on the annular periphery of the stator act in concert to produce the desired magnetic pole in the stator. The method by which this concerted action is realized may be understood with the aid of a general discussion of a magnetic circuit.

The number of lines of magnetic flux which thread a magnetic circuit is determined by dividing the total magnetomotive force exciting the circuit by the total magnetic reluctance encountered in traversing the circuit. In mathematical form, this is the familiar expression $$\text{Flux} = \text{MMF}/\text{reluctance}$$

If the magnetic circuit is composed at least partly of ferromagnetic material, with the balance being air or some high-reluctance material, it is readily understandable that the total magnetomotive force exciting the circuit can originate in electrical windings placed anywhere along the ferromagnetic material; it is not necessary for the windings to be placed in a single bundle at a single location. In computing the magnetic flux flowing in such a circuit, the magnetomotive force produced by windings at one location is added to that produced by other windings located along the circuit. The ferromagnetic composition in the winding portion of the magnetic circuit assures that coupling between the windings and the flux path is large and that leakage flux is small enough to permit simple algebraic addition of the several magnetomotive forces to obtain a practically useful total.

The stepping motor of the present invention uses this principle of magnetics in its stator; the magnetomotive forces generated by each of several windings along a flux path are added together, and the total is used to excite a magnetic circuit incorporating parts of the stator and rotor members.

In contrast to this summation of magnetomotive forces along a single magnetic path, it is also possible to have magnetic fluxes from two different magnetic paths sum together in a branch which is common to both paths. This concept may be illustrated by a simple analogy from hydraulics. If fluid from two different sources flows into the two end ports of a T fitting, the two fluid streams will combine and flow out of the T's center port. In magnetics, if the two arms of a T-shaped iron member are wound with electrical coils and the coils are excited so that their north seeking ends, or, for short, their north ends, are adjacent to each other and adjacent to the start of the T, magnetic flux from the T arms will combine in the T staff. Another result is that the free end of the T staff will assume a north magnetic polarity with respect to the free ends of the T arms.

In the present stepping motor, the stator assembly may be considered a plurality of these magnetic T's, the stator poles being composed of T staffs and the stator yoke being composed of the T arms joined into an annular ring.

If the stepping motor stator of this invention is considered to be such a series of joined magnetic T's, two other concepts important to its design may be appreciated. The first of these is that the amount of flux flowing from the open end of the T staff is controlled not alone by the excitation events in the T's arms but also, according to the expression Flux=MMF/reluctance, by the reluctance of the external magnetic path—the path which commences at the lower terminal of the staff. Related to the motor configuration, this means that the magnitude of flux flowing in a particular stator pole is dependent upon the position of the mating rotor pole; little flux threads a rotor and stator pole pair which are poorly aligned, the flux instead favoring a nearby better aligned rotor-stator pole pair which are located within the confines of the designated magnetic path.

In summary, the flux may flow across the top of a particular T with very little being diverted into the staff of the T if the external path commencing at the staff terminal has greater reluctance than that of some adjacent path. If no rotor pole is adjacent to a particular stator pole, little magnetic flux will flow in that stator pole; the flux will favor some other stator-rotor pole pair that are closely aligned. However, if there are no rotor and stator poles closely aligned, the flux will flow in some combination of an air path and a rotor portion, seeking for this flow the lowest reluctance total path but dividing the flux in proportion to the reciprocal of reluctances in any parallel paths.

The ability to have flux flow in an undiverted manner across the top of a T means that, in the motor, a particular pair of north and south stator poles may be generated by electrical windings placed anywhere between the north and south poles, notwithstanding the fact that other inactive stator poles may intervene between the north-south pair.

In addition to the idea that windings located anywhere inside the magnetic path of a north-south stator pair may contribute to the flux flowing in the pair, it is also understandable that unexcited windings located in this path will not add to nor detract from this flux; it is also understandable that these unexcited windings, if so connected, may, when excited, produce flux which is contra to the north-south pair; flux which could be used at some other time instant when a different pole configuration is desired.

With this general magnetic discussion as background, the magnetic properties and operation of the stepping motor disclosed in this invention may be understood by referring to FIGURE 3.

In FIGURE 3, there is shown an especially useful form of the stepping motor portion of the present invention. This motor is composed of a unitary ring stator member 22, which has attached twelve salient stator poles. The width 24 of the stator poles and that of the rotor poles is approximately the same. The faces 25 of the stator poles and those of the rotor poles are complementary in shape and are separated by an air gap when the poles are aligned, as shown at the top and bottom pole pair.

Between each of the stator poles in FIGURE 3 and the next pole lies a space 23, which is at least partly filled with electrical windings, as shown at 30 and 33. Windings are not shown between all the stator poles, even though they are actually present in the finished motor, since a better view of other details of the motor is presented without a showing of all the windings.

The rotor member of the motor in FIGURE 3 is composed of a body 29 mounted on a shaft and containing eight salient poles such as 27. The rotor body may be fabricated of the same material as the rotor poles in the present embodiment; however, for other designs, it is possible for the body 29 to be of a permanent magnet material and the rotor poles 27 of some different material, as will be explained in a later section of the specification.

The arrows shown in FIGURE 3 depict the flux pattern which is set up in a motor typical of this invention when its rotor is stationary. As shown in this figure, north magnetic poles are generated at the top and bottom, or twelve o'clock and six o'clock, poles, with south magnetic poles generated at the nine o'clock and three o'clock positions. The electrical windings located between adjacent north and south stator poles may for convenience be called a group of windings; hence, the windings 32, 34, and 38 in FIGURE 3 constitute one such group.

Within a group of windings, the concept of adding magnetomotive forces as described above becomes applicable. In the 32, 34, and 38 group, the two windings 32 and 38, located immediately adjacent to the north and south stator poles, are excited, and their combined MMF generates the flux flowing in the path 35.

Magnetic flux flowing in the path 28 is generated by windings, such as 33, located in the group. The two fluxes, that from the path 28 and that from the path 35, combine and flow in the common path, designated 31 in FIGURE 3, and generate a north magnetic pole at the twelve o'clock position. The adjacent north ends of the windings 33 and 32 are characteristic of the motor shown in FIGURE 3; adjacent winding ends with similar polarity occur at each of the four generated magnetic poles. The four windings positioned half-way between the excited poles—the windings, such as 34, which lie between poles at one and two o'clock, four and five o'clock, seven and eight o'clock, and ten and eleven o'clock—are not excited at the instant depicted in FIGURE 3. These four unexcited windings are so connected that, when excited, they produce MMF which opposes the general flux path represented as 35 in FIGURE 3. These windings are used, as will be described later, when the magnetic poles are to be shifted in position to effect rotation of the rotor member 29.

In use of the stepping motor embodiment shown in FIGURE 3, each of the windings assumes but two states—either the unexcited (off) state or the single polarity state described above. In this embodiment, reversal of winding polarity is not required. Absence of the need to reverse winding polarity dismisses complexity in the circuitry which excites the windings, and is hence desirable.

Although absence of a need to reverse winding magnetic polarity is a property which is advantageously used in the motor shown in FIGURES 1, 2, and 3, it is expressly intended that the present invention not be limited to this concept. In some other motor designs within the contemplation of this invention, winding polarity reversal is desirable in spite of the added complexity which it entails. FIGURE 8, which shows two magnetic rotor motors falling within the scope of this invention, is also an example of motors employing winding polarity reversal. The motors shown in FIGURE 8 are more fully described in a later part of this specification.

Flux paths 36 and 37 in FIGURE 3 may be classed as leakage or minor paths. The portion of the total generated flux which proceeds along the paths 36 and 37 is small and variable in magnitude according to the relative position of the rotor and stator teeth. As the rotor 29 moves clockwise, the reluctance of the path 36 increases, so that a smaller amount of flux traverses this path, while the opposite effect occurs for the path 37. It can be readily understood that the magnitude of the fluxes 36 and 37 as a function of time is a complex quantity depending on rotor velocity, pole size and shape, and other factors in the rotor design. For the sake of explanation in this description, the intermediate poles, those involved in the leakage flux paths, such as 36 and 37, will be called minor poles, while the remaining poles, the ones at any instant assuming north and south status, will be called primary poles or active poles.

To effect rotation of the rotor member 29 in FIGURE 3, the connection of the motor windings to the power supply is changed. After this change, the primary stator poles are moved from the twelve o'clock, six o'clock, nine o'clock, and three o'clock positions at one o'clock, seven o'clock, ten o'clock, and four o'clock positions, respectively. Since a torque is exerted on the rotor until the minimum reluctance path is formed between north and south stator poles, the rotor will be coerced to move as a result of the stator pole change; the direction of rotation of the rotor will be counter-clockwise for the poles named, since the rotor poles are partially engaged with the new primary stator poles and will become fully aligned by only a slight counter-clockwise motion. Initial alignment with the rotor poles which would have caused clockwise rotation is much less and involves a high reluctance air path.

The mechanism for causing the primary stator poles in FIGURE 3 to move to the one o'clock, seven o'clock, ten o'clock, and four o'clock positions may be understood by considering the flux path 35 in FIGURE 3. From this figure, it may be observed that, if the winding 33 is switched to the "off" state, while the winding 34 is switched to the "on" state, the former primary pole at twelve o'clock will become a minor pole, while the pole at one o'clock will become a primary pole but a primary pole of south polarity as contrasted to the north status that the twelve o'clock pole previously had. As explained prevously, the winding 34 is so connected that, when excited, its MMF opposes that of the path 35.

Figure 4:
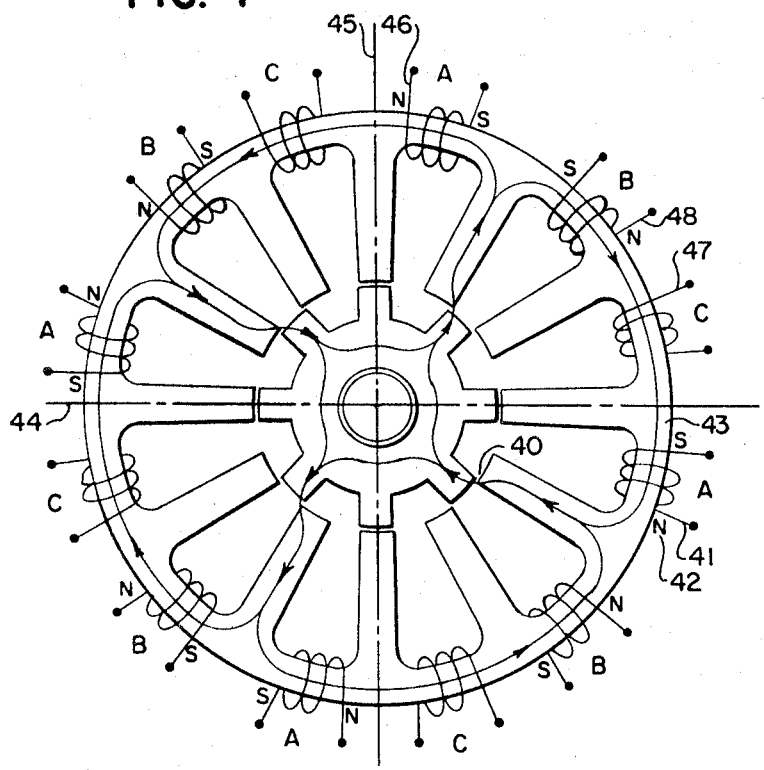
FIGURE 4 is an end view of a motor constructed according to the present invention, showing magnetic flux paths existing after pole change and before rotation commences.

A corresponding change in excited windings is simultaneously effected between the windings 38 and 39, the winding at 38 being turned "off" while that at 39 is turned "on." This generates a north primary pole at the four o'clock position and completes a magnetic path for the flux flowing in the one o'clock pole. FIGURE 4 illustrates the complete flux pattern existing in the motor after stator pole change has occurred but before movement of the rotor.

In general, the foregoing explanations and the following descriptive material present no need to distinguish between a stator tooth portion and a stator pole. In the strictest sense, a distinction between these two terms is possible, the term "stator pole" being used to refer to a stator tooth portion which at the instant of consideration has magnetic fluxes summing within it and assumes the identity of a north or south magnetic pole.

Since all tooth portions of the present stepping motor invention assume the status of a magnetic pole at some instant of time during motor operation, the designation "pole" is used in describing stator tooth portions.

Although the preferred embodiment of the present invention restricts the use of the intermediate windings such as 34 and 39 of the FIGURE 3 motor to those occasions where are needed to form an adjacent active pole, it is not essential that this restricted use be employed. It is perfectly feasible and within the scope of this invention to pass current through all of the windings on the motor and have the MMF from all windings contribute to the desired flux by providing in the exciting source a switching network capable of accomplishing the winding interconnections so required. It is possible in most practical motors to achieve the desired flux magnitude without using all windings, and, since this approach reduces the switching network complexity, it is preferred.

As previously noted, the windings on the twelve pole stator stepping motor may be readily divided into four groups with each group containing three windings. Since the exciting of similarly placed windings in each of these four groups occurs at the same time in order to achieve the desired magnetic path, these similarly placed windings in each group may be considered in unison and may be conveniently referred to as a set of windings. To further facilitate this concept, the windings in FIGURE 4 are identified with a letter, there being four windings with the letter A, four with the letter B, and four with the letter C. The letter A hence refers to one winding set, while the letters B and C refer to the remaining two sets. The individual ABC groups of these windings in FIGURE 4 are shown to be separated by the conventional mutually perpendicular coordinate axes designated 44 and 45.

Because of the magnetic polarities indicated in FIGURE 4, the B windings are electrically connected to have current flow in the opposite direction compared to the A and C windings; where current flows into the starting turn 46 and 47 of the A and C windings, the B winding will have current flowing into its finish turn 48. This reverse connection of the B winding set permits all windings on the stator to be wound in the same direction to reduce fabrication cost.

Figure 5A:
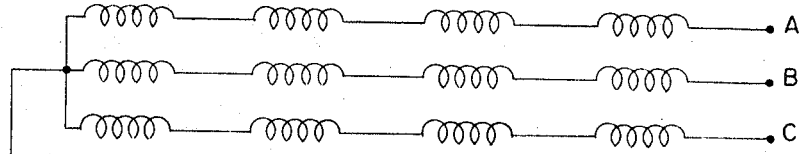
FIGURE 5, which has parts 5a, 5b, and 5c, is an electrical schematic diagram showing three alternate connections for the motor windings in a particular embodiment of the motor.
Figure 5B:
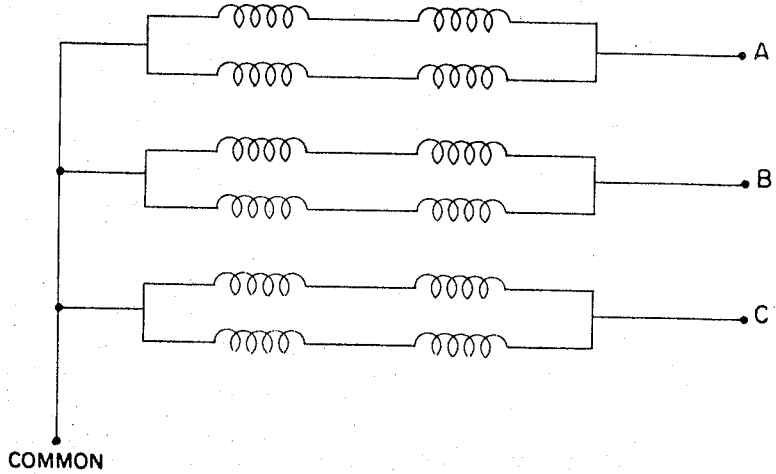
Figure 5C:
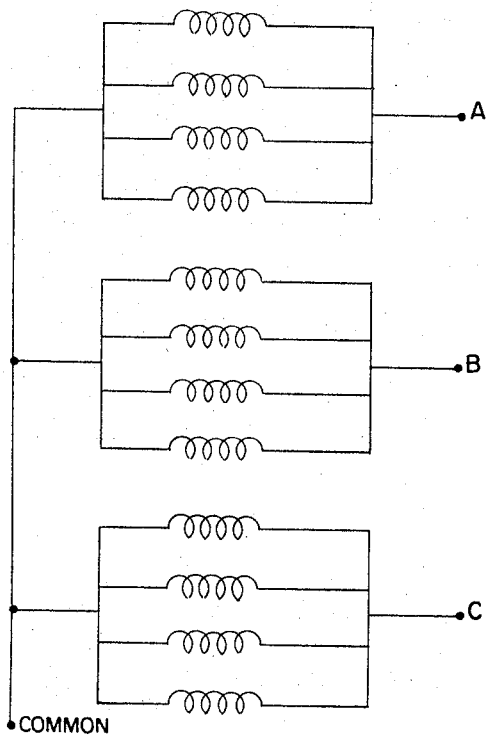

FIGURE 5 of the drawings shows three of the possible methods for connecting the twelve (or three sets of) electrical windings used in this motor; other connecting schemes are possible while maintaining the basic requirement of exciting four windings in similar fashion. One variation may be used when solid state electronic switches of limited current capability are employed; in this event, each of the twelve windings may be controlled by a separate switching device, with the four switches for each set of windings being operated at the same time.

With the A, B, C lettering scheme and the switching operations described above, it is easy to incorporate digital computer logic symbology for the successive excitation states existing in the winding sets during rotation of the rotor member. For counter-clockwise rotation, the following sequence occurs:

$$A\bar{B}C$$
$$AB\bar{C}$$
$$\bar{A}BC$$

For clockwise rotation, the following sequence occurs:

$$A\bar{B}C$$
$$\bar{A}BC$$
$$AB\bar{C}$$

the symbol $\bar{X}$ in each instance indicating a winding set which is not excited.

In the following paragraphs, this logical description of the motor's winding states is employed to clarify understanding of a braking system which is compatible with this motor.

United States patent application Ser. No. 611,622, filed Jan. 25, 1967, referred to earlier in the present application, discloses a method for braking a stepping motor and causing it to reach the intended position rapidly without undergoing a period of damped oscillations about the intended position. The method of that application may also be applied to the present motor.

In essence, the method of that referenced application require that a period of reverse rotation torque be applied to the stepping motor just before the desired position is reached and that this reverse torque be removed when the motor has halted. Following the reverse torque application, original excitation is returned to oppose any tendency toward reverse rotation; this excitation is then maintained during the stationary period.

The braking sequence may be described in terms of the logic symbology defined above; using this symbology, the motor may be assumed to be rotating under the influence of a continuing series of $A\bar{B}C$, $AB\bar{C}$, $\bar{A}BC$, $A\bar{B}C$, etc., conditions. If stopping is desired in the $AB\bar{C}$ position, the motor would receive the following sequence:

$$A\bar{B}C, AB\bar{C}, A\bar{B}C, AB\bar{C}$$

In this sequence, the $A\bar{B}C$ condition represents the reverse torque period which is applied, then followed by the normal event, which is $AB\bar{C}$.

Another, and an often desired, property of a stepping motor concerns uses where the motor is to be operated in the rotating mode as opposed to the step and hold mode; that is, where the motor is desired to pass rapidly through a series of step positions in the manner of a conventional synchronous motor. In such uses, the application point and the duration of each stepping pulse are critical factors and must be optimized to obtain smooth motor performance. The motor of the present invention is amenable to techniques for optimizing these times. These techniques may be regarded as either open loop in nature (that is, they incorporate no sensing of rotor position) or closed loop in nature (that is, a feedback signal is transmitted from the motor to its control circuit). In a closed loop control system, a rotor-position-sensing signal may be derived from an optical or magnetic transducer in a manner familiar to those skilled in the art. A position signal may also be derived from the voltage or current waveform induced in a motor winding.

In FIGURE 6 of the drawings, the stepping motor portion and the electrical excitation portion of the present invention are shown together. The stepping motor 49 shown in this figure is of the twelve stator pole and eight rotor pole variety shown in the previous figures. The excitation source 50 in FIGURE 6 is connected to the rotor winding by means of leads 51 and terminals 52. The relation shown between the stepping motor and the excitation source in FIGURE 6 is typical of that which is employed when the stepping motor means shown in other parts of this specification are to be activated.

The excitation source 50 in FIGURE 6 includes an energy source such as a power supply or a battery as shown at 53 and an array of switches as shown at 54, 55, and 56. Although these switches are shown in electromechanical form, it is intended that this representation include electronic devices such as thyrectors, transistors, and vacuum tubes. The switch elements in FIGURE 6 are shown in the $\overline{ABC}$ position, which, as defined above, applies power to eight of the twelve stator windings (two of the three sets) at one instant.

The diodes such as 57 which are shown in the excitation source are incorporated in a practical embodiment to reduce the arcing at switch contacts or, in the case of electronic switches, to limit the reverse voltage surge encountered when current in the inductive circuit is interrupted.

The control logic block 59 in FIGURE 6 provides the means for converting the system control signals into a form which is usable to operate the motor's power switching devices 54, 55, and 56. The control logic may be composed of electromechanical relays or electronic circuits such as flip-flops, one-shot multivibrators, and logic gates.

In FIGURE 6, the control logic block is shown receiving a motor start command 60 and a stop command 61. These commands may be combined into a single start-stop signal in some applications. Also shown entering the logic block is a position feedback signal 58. This signal provides the means for precisely-timed switching of the power applied to the motor windings to effect smooth and fast rotation of the rotor element if necessary.

In addition to the basic control system shown in FIGURE 6, some applications for the stepping motor of this invention may realize improved motor performance through the use of a source voltage larger than that required to sustain the prescribed steady state winding current. Among the advantages realizable when this technique is employed are:

(1) Decreased time delay between application of motor voltage and reaching a current level sufficient to induce rotor movement.
(2) Increased acceleration or deceleration torque for starting or stopping the rotor.

The stepping motor of this invention can especially realize the second mentioned advantage, since the decrease in space required for interpolar electrical windings provides a means for increasing the cross-sectional area and the flux-carrying ability of the magnetic path; in many prior-art stepping motors, limited magnetic cross-sectional area and the resulting magnetic saturation restrict the usefulness of increased voltage techniques.

Incorporation of the increased voltage technique into FIGURE 6 requires the addition of a higher voltage power source, additional switching devices, more logic circuitry, and possibly a current-limiting resistance in series with each winding set.

Most of the so-far-discussed drawings of a motor built according to the present invention having twelve stator poles and eight rotor poles. This motor, called the 12S x 8R motor for simplicity, is an economical design and is suitable for many applications; however, it is not the only pole configurations which can be embodied within the present invention In general, the relation $$n = \left| \frac{sr}{s-r} \right|$$

where the bars | | indicate absolute value irrespective of algebraic sign, expresses the relation between the number of steps per revolution, $n$, the number of stator poles, $s$, and the number of rotor poles, $r$, that may exist in motors designed with this invention. In this relation, the absolute value bars have the physical significance of expressing that either the number of rotor poles, $r$, or the number of stator poles, $s$, may be greater.

The following table is a list of related motor, stator, and steps-per-revolution values obtained from the above formula and representing motors with up to twelve rotor or stator poles that may be used in an embodiment of this invention.

| Degrees per Step | Steps per Revolution, $n$ | Number of Stator Poles, $s$ | Number of Rotor Poles, $r$ |
|---|---|---|---|
| 90 | 4 | 4 | 2 |
| 60 | 6 | 6 | 3 |
| 60 | 6 | 3 | 6 |
| 45 | 8 | 8 | 4 |
| 45 | 8 | 4 | 8 |
| 36 | 10 | 10 | 5 |
| 36 | 10 | 5 | 10 |
| 30 | 12 | 4 | 3 |
| 30 | 12 | 3 | 4 |
| 18 | 20 | 5 | 4 |
| 18 | 20 | 4 | 5 |
| 15 | 24 | 12 | 8 |
| 15 | 24 | 8 | 12 |
| 15 | 24 | 8 | 6 |
| 15 | 24 | 6 | 8 |
| 12 | 30 | 6 | 5 |
| 12 | 30 | 5 | 6 |
| 10 | 36 | 12 | 9 |
| 10 | 36 | 9 | 12 |
| 9 | 40 | 10 | 8 |
| 9 | 40 | 8 | 10 |
| 60/7 | 42 | 7 | 6 |
| 60/7 | 42 | 6 | 7 |
| 45/7 | 56 | 8 | 7 |
| 45/7 | 56 | 7 | 8 |
| 6 | 60 | 12 | 10 |
| 6 | 60 | 10 | 12 |
| 5 | 72 | 9 | 8 |
| 5 | 72 | 8 | 9 |
| 90/33 | 132 | 12 | 11 |
| 90/33 | 132 | 11 | 12 |

This table is terminated with twelve as the largest number of rotor or stator poles; using the above formula, it may be extended to larger numbers. Motors with more than twelve poles, though requiring careful design and fabrication, are possible employing the toroidal winding concept.

Figure 7A:
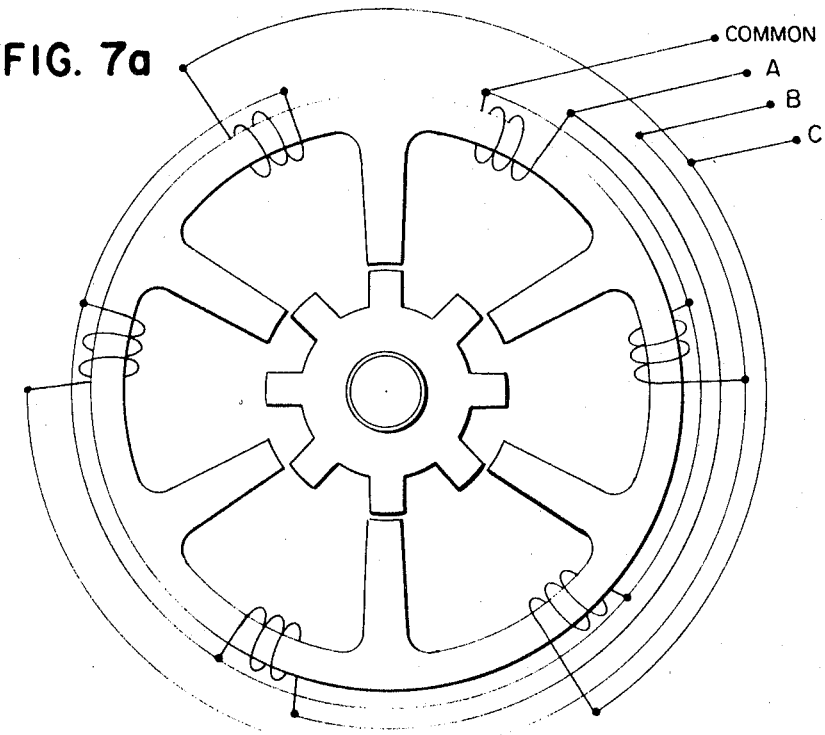
FIGURE 7, with parts 7a and 7b, is an end view of two other pole configurations feasible with the present invention.

The 12S x 8R motor shown previously in this application operates with fifteen-degree steps and with four rotor and four stator poles being active at a particular time. From the above table, one may observe that a fifteen-degree step motor may also be fabricated using a 6S x 8R configuration; such motor is depicted in FIGURE 7a. As may be observed in FIGURE 7a, the 6S x 8R motor operates with only two rotor poles and two stator poles being active at a particular time; hence, it produces lower torque than the 12S x 8R motor previously described.

Figure 7B:
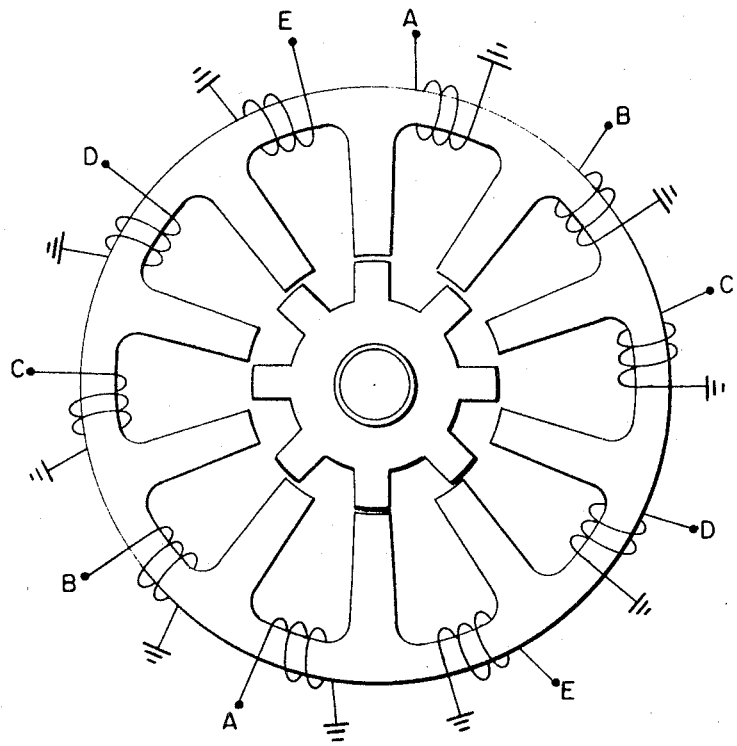

Another motor design from the above table, the 10S x 8R motor, is shown in FIGURE 7b. This motor also operates with only two rotor poles and two stator poles active at a particular instant, its major advantage being the small (nine-degree) angular motion which occurs during each step.

The 6S x 8R motor shown in FIGURE 7a, when examined for its magnetic paths, is found to have two similar and concurrently operating halves and hence may be wired to have the similarly-placed windings in each half connected into sets and excited at the same instant. As a result of this connection, the motor resolves into one requiring three switching devices in the excitation source (one for each winding set) just as does the previously-discussed 12S x 8R motor.

By a similar examination, it may be observed that the motor in FIGURE 7b requires five switching elements in the excitation source. In lieu of showing actual wired connections, the five winding circuits are identified by five different letters in FIGURE 7b.

Some of the motors represented by entries in the above table require external starting equipment, since in some configurations the basic motor either has zero starting torque or is unable to select a direction of rotation without external guidance. This characteristic is found in motors having the number of rotor and stator poles related by a whole integer multiplier; for example, a four-pole rotor and an eight-pole stator.

Motors having an odd number of rotor poles and an odd number of stator poles are incorporated into the table shown above. While not as practical and obviously useful as motors having an even number of rotor and stator poles, these motors, which are inherent in the above-expressed relation between $s$, $r$, and $n$, are structurally possible. Generally, the motors with an odd number of rotor or stator poles necessitate that one pole must exit flux which has entered through two or more poles in contrast to the one entry to one exit pole correspondence found in motors with even numbers of poles.

Current reversal or bi-polar excitation in the motor field coils may also be an advantage in some of the motors represented by entries in the above table; this is in contrast to the 12S x 8R motor shown in FIGURE 1, where unidirectional field current flow is sufficient.

As depicted thus far in the description of the preferred embodiment, the stepping motor of this invention has operated by exciting a magnetic path with D.C. flux and permitting the rotor to move until a position of minimum magnetic path reluctance exists. Two variations in this mode of operation which are within the scope of this invention are possible. One of these variations changes the D.C. principle and retains the reluctance principle; the other retains the D.C. principle and changes the reluctance principle.

The stepping motors represented in FIGURE 1 through FIGURE 7 are not influenced by the absolute magnetic polarity of the individual poles so long as the relative polarities are correctly assembled to form a continuous flux path. The motors depicted in these figures would perform satisfactorily if all polarities were reversed instantaneously.

In essence, this ability of the stepping motor to operate with reversed polarities permits it to be operated from A.C. power in lieu of the customary D.C. power.

Some accommodation in the quantitative design of the stepping motor are required for A.C. operation, since steady state winding current will be influenced by winding inductance as well as resistance and since power losses from the magnetic material must be considered; the basic operating principle as well as the motor structure can remain the same as for the previously described motors, however. The embodiment shown in FIGURE 6, the excitation circuits for the motor, also satisfactorily typifies the excitation circuit for A.C. motor operation. For A.C. operation, Triacs or similar bi-polar switching devices may perform the switching function, and an A.C. generator can replace the D.C. energy source. For the A.C. case, thyrite protectors or other bi-polar devices can be used to replace the diodes 57 for voltage transient limitation.

If the pulsating torque produced by the stepping motor under A.C. power is undesirable, well-known techniques of using shading coils or multiple-phase excitation may be employed in the motor by suitable design allowances.

The second departure from D.C. reluctance operation of the stepping motor invention, which is also within the scope of this invention, concerns use of a rotor member which is a source of magnetic flux in the motor. The magnetic rotor motor offers advantages in lower power requirements and increased torque when compared to passive rotor design. The magnetic rotor feature may be achieved through the use of permanent magnet materials in the rotor or by employing current-carrying rotor windings and a slip ring assembly.

Figure 8A:
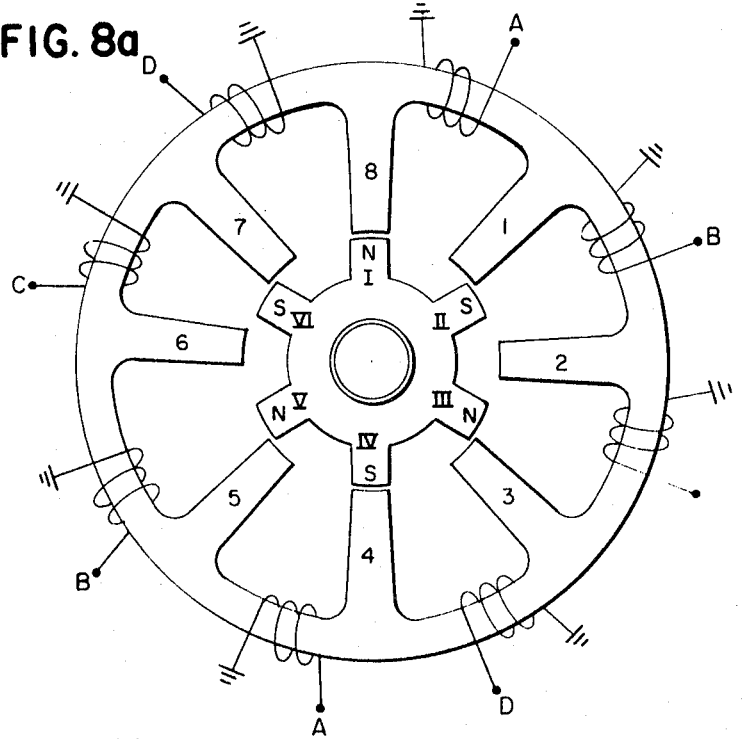
FIGURE 8, which has parts 8a and 8b, is an end view of two pole configurations possible when motors of the present invention are fabricated with a magnetized rotor.
Figure 8B:
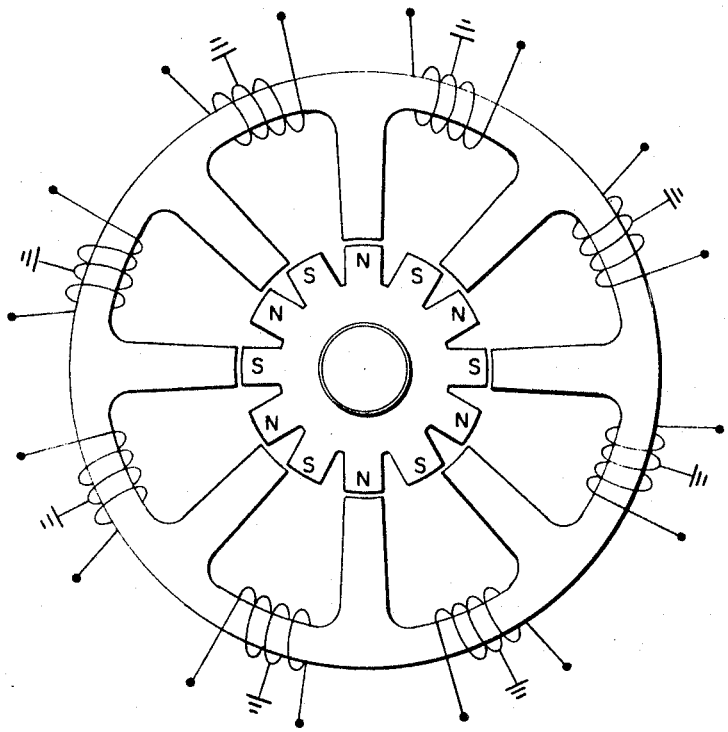

FIGURE 8 shows two possible motor configurations employing the magnetic rotor principle; the first, in FIGURE 8a, is an eight-pole stator combined with a six-pole rotor. This motor is characterized by having two active stator poles at any instant. The second motor in FIGURE 8b is the inverse pole configuration to the preferred embodiment motor of FIGURES 2 and 3, having twelve rotor poles and eight stator poles and realizing four active stator poles at any instant.

When a magnetic rotor is employed in the stepping motors, as shown in FIGURE 8, it is necessary for a given stator pole to assume both magnetic polarities as the rotor successively changes position. This requirement makes it necessary to reverse current flow in the stator windings periodically as opposed to the non-magnetized rotor designs, where the twelve-pole stator and eight-pole rotor configuration requires only the turning "off" or "on" of stator currents without reversal.

The coils and stator assembly of the motors shown in FIGURE 8 operate in the fashion already described for the reluctance version of the motor; the two coils immediately by an individual stator pole are excited, so that their adjacent faces have the same polarity—namely, that of the adjacent stator pole—and MMF from two or more stator windings in a group combines to generate a magnetic flux, with the fluxes combining in stator teeth to generate stator poles. Rotation is achieved by causing a stator pole to assume magnetic polarity opposite that of a rotor pole, so that rotor and stator poles are attracted. In the 8S x 12R motor of FIGURE 8, four pairs of these attracting rotor and stator poles exist at a given instant.

Figure 9:
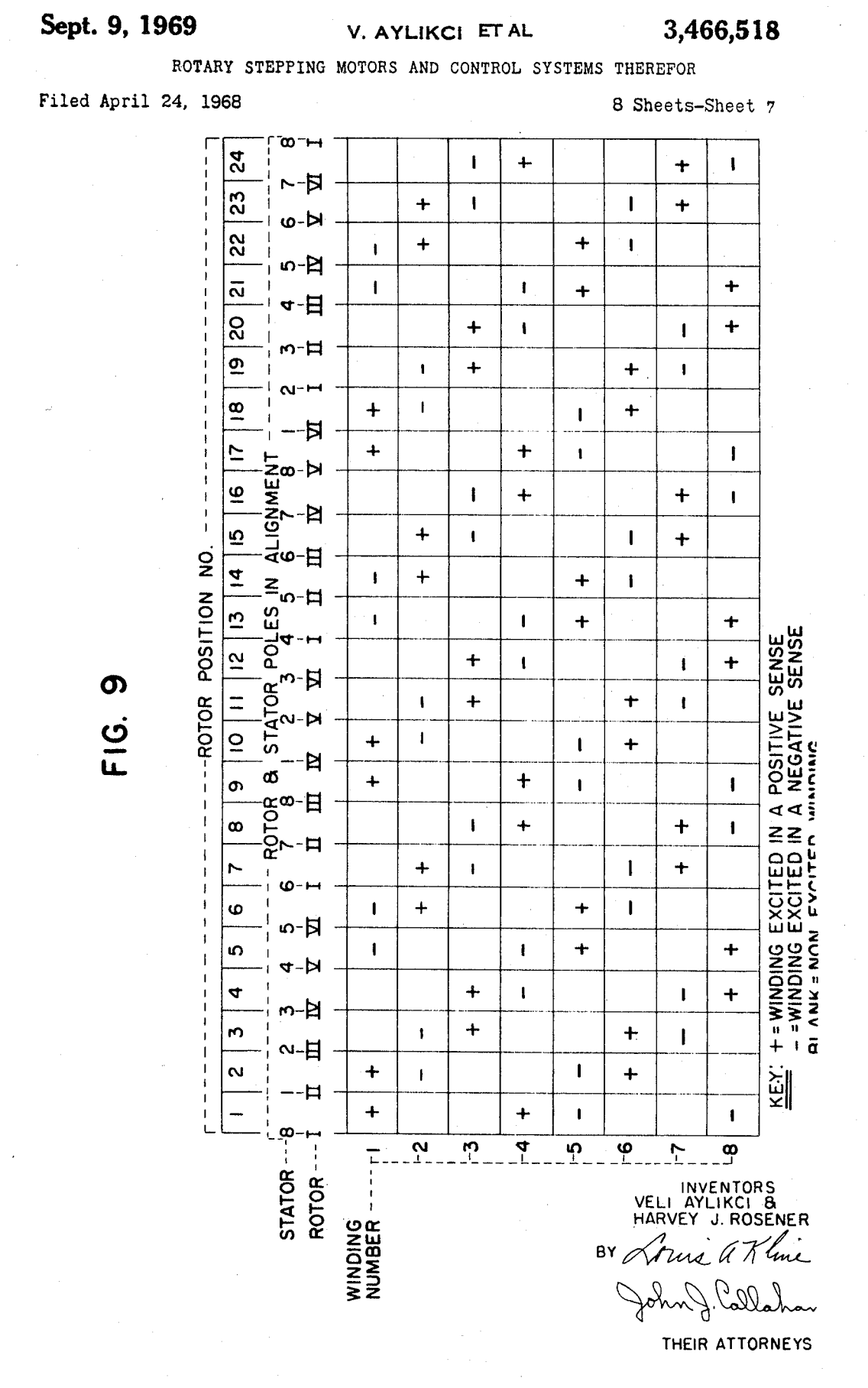

FIGURE 9 of the drawings is a chart which defines the winding connections to be employed with the FIGURE 8a permanent magnet rotor stepping motor. By means of the chart of FIGURE 9, the logic network for driving the exciting switches for the FIGURE 8a motor can be assembled, and the parallel connections for the FIGURE 8a windings can be defined.

In constructing the chart of FIGURE 9, it is assumed that each of the two independent magnetic paths which join the active stator poles is excited by two sets of windings, one set adjacent to each active pole. The intermediate windings which lie between the two active winding sets are assumed to be non-excited in the chart. A similar chart may be constructed under the assumption that one or both of these unused winding sets is excited. So long as a sufficient number of ampere turns of magnetomotive force can be developed using two windings in each path, it is unnecessary to bring on the switching complexity which necessarily attends the use of all four windings between active pole pairs.

In FIGURE 8a, the stator poles are numbered with numerals from 1 to 8; the adjacent stator windings are also numbered with numerals from 1 to 8.

The permanently-magnetized rotor poles in the motor of FIGURE 8a alternate in magnetic polarity and are identified individually by the Roman numerals I to VI. The entries at the top of FIGURE 9 identify each of the twenty-four steps of the rotor and show which rotor and stator poles are aligned during a particular step.

If the rotor position shown in FIGURE 8a is taken as an example, the technique for constructing and for understanding the chart of FIGURE 9 may be comprehended. To excite the motor and maintain the position shown in FIGURE 8a, an active pole at stator positions 4 and 8 is required. This is accomplished by exciting windings 8 and 1 at the top stator pole and windings 4 and 5 at the bottom stator pole.

If the windings at the top stator pole are considered, it may be observed that, in order to achieve cooperation between the windings, so that both contribute to the flux flowing in the pole, it is necessary for the current to enter the starting turn of one winding and the finish turn of the other winding. Expressed in a different manner, one winding must be excited in the positive sense, the other in the negative sense. This situation is indicated in the motor winding connections and in the chart of FIGURE 9, where, during period 1, winding 1 is indicated to be excited in the positive sense, while winding 8 is indicated to be excited in the negative sense. Corresponding events occur at the bottom pole, pole 4 with windings 14 and 15 being excited in a reverse manner.

As the chart of FIGURE 9 indicates, the general excitation pattern encountered by a particular stator winding calls for it to be switched "ON" in the positive sense for two rotor step positions, then switched "OFF" for two step positions, then switched "ON" in the reverse sense for two rotor step positions, followed by another two-position "OFF" period.

The letters used to designate the winding terminals in the motor of FIGURE 8a serve the same purpose as the letters previously used in FIGURE 7. With these letters, the different outputs of the excitation source may be connected to the appropriate winding set; for example, one output of the excitation source is applied between ground and the A terminals of windings 1 and 5. Another output of the excitation source is applied between ground and the B terminals of windings 2 and 6.

In order to accomplish the bidirectional current flow required in the motor windings of FIGURE 8a, the excitation source must be capable of supplying current from both a positive voltage source and a negative voltage source at alternate times. An excitation source capable of this function is shown coupled to the FIGURE 8a stepping motor in FIGURE 10.

Figure 10:
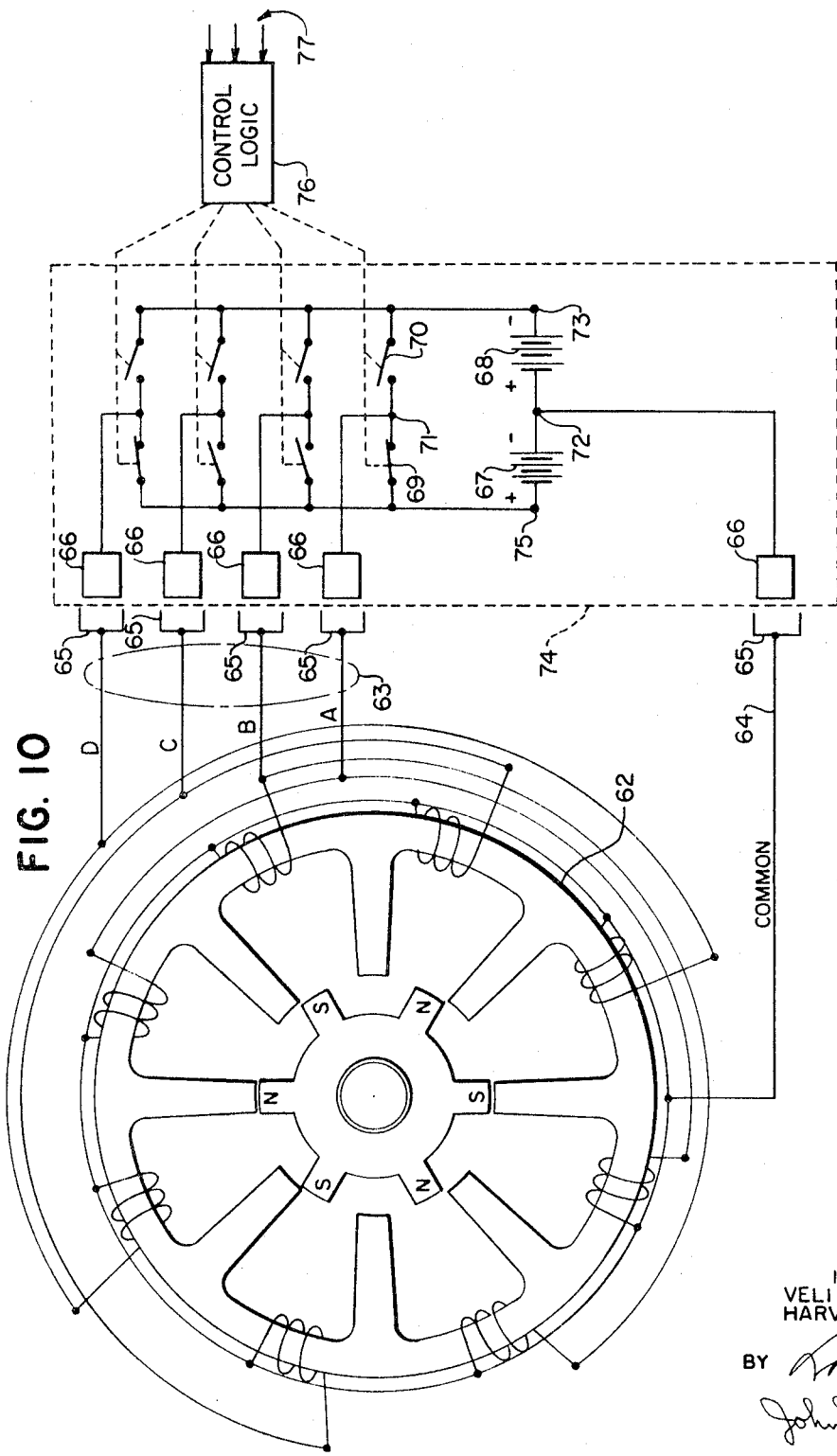
FIGURE 10 is an electrical schematic showing connection of a magnetic rotor motor to a bipolar excitation source.

FIGURE 10 shows a stepping motor similar to that of FIGURE 8a. This motor is coupled by means of leads 63 and 64 to an excitation source 74. The lead marked 64 is common to each winding on the motor; each of the remaining four leads at 63 couples a two-winding set from the motor to the excitation source. Terminals such as 65 and 66 provide means to couple the leads to the excitation source.

At 67 and 68, inside the excitation source, two series-connected energy sources, represented as batteries and constituting a bi-polar source of energy, are shown. The common terminal 72 of these energy sources is connected to the common winding terminal of the motor via the lead 64. The terminal 75 and the left-most array of switches in the electrical excitation source of FIGURE 10 correspond to the similar components in the uni-polar electrical excitation source of FIGURE 6. The terminal 73, the energy source 68, and the right-most array of switches in FIGURE 10 represent components added to realize a bi-polar excitation source.

In FIGURE 10, the two switches 69 and 70 afford paths for a bidirectional current to flow in the winding set A. The remaining switches provide for bidirectional currents in the other winding sets. Depending upon the polarity desired in the motor windings of set A, one of the two switches 69 or 70 will be closed. If winding set A is not needed in exciting the motor at a particular instant, both switches may be opened. Closing of both switch 69 and switch 70 at the same instant is undesirable because of the low impedance path thereby placed across the energy sources; simultaneous closing is excluded in the control logic 76 and may also be prevented by mechanical interlocks familiar to those skilled in the art when the switches are of the mechanical type.

The control logic 76 provides a means to convert the command signals 77 into a form usable by the stepping motor, as already explained for FIGURE 6. The chart in FIGURE 9 shows in detail the sequence of winding events which must be maintained by the control logic in FIGURE 10.

The bi-polar excitation source in FIGURE 10 permits the magnetomotive force developed by each winding of the FIGURE 10 stepping motor to assume either magnetic polarity. It is possible to achieve this result through the use of a uni-polar excitation source, as shown in FIGURE 6, if the electrical windings are made to be bi-polar or center-tapped, as shown in the FIGURE 8b motor; in essence, the desired result may be obtained if either the energy source or the motor windings are made bi-polar. Since these two concepts are equivalent, a drawing showing connection of the FIGURE 8b motor to an excitation source is not necessary.

As an aid to understanding the overall scope of the present stepping motor invention, some of the advantages which accrue to its design and several comparisons with conventional stepping motors may be considered.

One major benefit realized from the stepping motor of the present invention is evident if the manufacturing process for motor stators is considered; specifically, if the method for placing the electrical windings on the stator is considered. In the conventional stepping motor, if the electrical windings are pre-formed into shape on an external spindle and then enclosed in an insulated bundle, the motor design must provide adequate space between adjacent pole tips to permit slipping the winding onto the pole during motor assembly.

If space between adjacent stator pole tips is not sufficient to permit pre-formed windings in the conventional stepping motor, it is necessary to place them one turn at a time by employing hand winding or an elaborate winding machine adjusted for the particular motor's dimensions. Cost becomes undesirably high for either of these methods.

The stepping motor of the present invention may be wound with a conventional toroid winder using the method which employs a rotating shuttle of wire. With such a toroid winder, the winding turns are placed one at a time but at a rapid rate, so that fabrication costs are low.

The ability to place windings one turn at a time permits the spacing between adjacent starter poles of the present motor to be minimum. This minimum spacing need be only large enough to admit one winding strand at a time.

The space which is devoted to clearance between poles in most stepping motors may be utilized in the present motor either for an increased number of stator poles or for incorporating a smaller rotor diameter or for increasing the pole cross-sectional area in the present motor. As an example of where these modifications may be useful, a small rotor diameter is desired where mechanical inertia must be low to permit rapid acceleration. In such a motor, increased pole cross-sectional area is also often desired, since output torque achieved before curtailment by saturation will thereby be larger, and the use of high transient currents in the motor is thus permitted.

Another benefit which may be realized from the reduced between-the-poles winding space requirement in the present motor concerns the ability to shorten the length of stator poles; since the stator poles in a particular motor frame are required to be only long enough to exceed the winding pile depth, it is now possible to reduce pole length by a factor of one third to one half when compared to the conventional stepping motor. With a corresponding increase in rotor pole length, the motor of this invention becomes capable of increased output torque because the force generated between rotor and stator poles acts through a longer lever arm; namely, the longer rotor radius.

Placement of a large percentage of the electrical windings outside the critical space between stator poles in the present motor has several secondary fabrication advantages.

The number of conductors making a right-angle bend between stator poles is materially reduced. Since it is difficult to make winding turns conform exactly to the shape of the lamination stack at a corner, a region of poor compliance and greater space consumption is associated with each right-angle bend of the windings. The present motor, by reducing the number of these right-angle bends between poles and by placing the bends in a radial plane rather than a tangential plane, improves upon this fabrication difficulty.

If care is taken to place the stator windings, which are outside the toroidal enclosure of the present motor, in a uniform and regular manner into one or more layers, less radial space is necessary for the motor than when these windings are placed entirely between the poles. This permits greater output from a stepping motor of given diameter.

If for some reason hand winding is adopted in a conventional stepping motor which has its windings placed on the stator poles, the operator has access to only a small fraction of each winding turn, since over one half of each turn lies between the stator poles. In the present stepping motor, well over one half of each winding turn is accessible to an operator, since it lies outside the motor. Winding accessibility to the operator is desirable both for inspection and for ease in forming the windings into shape.

In high-performance stepping motor applications, provisions to conduct heat out of the motor enable performance beyond the "normal" capability of a motor of given size. From this viewpoint, the stepping motor of this invention is also improved over a design which places the windings on the stator poles, since either a convention or a forced cooling fluid can move freely through the motor and can reach remote parts of the winding surface in greater quantity. This is especially helpful in reducing winding hot spots which endanger insulation life. In essence, the increased cooling ability has the effect of increasing the power dissipation possible in a given motor frame.

One prior-art stepping motor employs a stator composed of annular segments each carrying its own set of electrical windings and assembled after winding into a ring-like structure by employing non-magnetic material interposed between stator segments. The stepping motor of the present invention improves upon this prior-art motor in the ability to easily achieve high step position accuracy. The position accuracy attained with any stepping motor is dependent upon the mechanical tolerances maintained in locating the rotor and stator poles at their ideal positions; mislocation of even one rotor or stator pole results in the rotor attaining equilibrium while displaced from the ideal position.

The stepping motor of the present invention is not subject to position error from imperfectly-located stator poles, since the pole positions are dependent not upon the accuracy of an assembly operation and the tolerance of numerous small parts, but, instead, upon the ability to design and accurately punch out a single stator pattern for each lamination. Since the accuracy of this stator pattern is a matter of tool design and can be readily maintained once achieved, the stepping motor of the present invention realizes high position accuracy much more readily than the prior-art device.

In the present motor, a stator frame which is unitary in circular structure and composed of magnetic material without air gaps also permits the use of flexible flux paths that are fully determined by conditions external to the motor. In the present motor, the flux pattern generated in exciting a particular stator may be altered by changing the electrical connections to the stator windings. This can be done with complete freedom, since the stator pattern is not limited by air gaps. Further exploitation of this property in the motor of the present invention can lead to excitation systems which excite two adjacent poles simultaneously in order to achieve intermediate rotor positions.

Some changes may be made in the construction and arrangement of the stepping motors of this invention without departing from the real spirit and purpose of the invention, since the descriptions which have been given are by way of example only. The following claims are intended to cover modified forms or equivalents which reasonably fall within their scope.

What is claimed is:

1. A stepping motor system comprising:
   a stepping motor device including
      a stator member having a plurality of teeth,
      a rotor member having a plurality of teeth,
      and an electrical winding toroidally wound on said stator member between each of said teeth thereof, in groups,
      with the windings in each of said groups capable of being electrically excited in an individually selective manner, and
      with each winding, similarly located in each of said groups, connected together in a plurality of sets of windings capable of being simultaneously electrically excited;
   electrical excitation means for exciting said electrical windings;
   and logic control means for controlling said electrical excitation means to cause two or more sets of windings to be selectively excited to generate in said stator member a plurality of magnetic poles spaced around said stator member in alternating magnetic polarity,
   with said magnetic poles being rotated around said stator member by said control means through excitation of different combinations of two or more sets of windings to cause said rotor member to be rotated.

2. A stepping motor system as defined in claim 1 wherein said electrical windings are arranged in three sets and four groups.

3. A stepping motor system comprising:
   a stepping motor device including:
      a unitary ring-shaped stator member having a plurality of evenly-spaced teeth,
      a rotor member having a plurality of evenly-spaced teeth, and
      a plurality of electrical windings placed on and around said stator member in groups of adjacent electrical windings,
      with the windings in each of said groups capable of being electrically excited in an individually selective manner, and
      with individual windings, similarly located in each of said groups, connected together in a plurality of sets of windings capable of being simultaneously electrically excited;
   electrical excitation means for exciting said electrical windings; and
   control means for controlling said electrical excitation means to cause at least two sets of windings to be selectively excited at any one time,
   said selective excitation of winding sets being effective to cause, in each group of windings, magnetomotive force from one winding in one excited set to combine with that from another winding in another excited set and generate in said stator member a magnetic flux,
   said generated flux from each group of windings and magnetic flux generated in the same manner by an adjacent group of windings being combined in a stator tooth lying between adjacent groups of windings,
to generate in said stator member a plurality of magnetic poles evenly spaced around the periphery of said stator member in alternating magnetic polarity,
with said magnetic poles being rotated about said stator member by said control means through excitation of different combinations of two or more sets of windings to cause said rotor member to be rotated.

4. A stepping motor system comprising:
a stepping motor device including:
- a stator member having a plurality of evenly-spaced attached tooth portions,
- a rotor member having a plurality of evenly-spaced attached tooth portions,
  with said stator and rotor tooth portions being separated at their free ends by an air gap so that said rotor may rotate with respect to said stator member,
  said stator member comprising a unitary ring and having electrical windings mounted thereon and magnetically coupled thereto, said windings being placed one between each two stator tooth portions,
  said electrical windings being divided into a number of sets, each set containing the same number of windings as each other set,
  the windings which compose one set being connected together electrically so as to be excited in unison, and
  the windings in one set being excitable independent of any other set,
  with each set containing the same number of windings as the number of pairs of rotor and stator tooth portions which align at any one position of said rotor member,
  with the number of sets being equal to the number of windings between an alignable pair of rotor and stator tooth portions,
  thereby denoting that between each aligned pair of rotor and stator tooth portions in any rotor position there is located a number of windings, said number of windings being one winding from each of said winding sets,
  thereby also denoting that each set comprises a symmetrical, evenly-spaced arrangement of windings about the circumference of said stator member;
electrical excitation means for said stepping motor device,
  said electrical excitation means comprising an energy source, and switching members individually connecting each of said winding sets to said energy source; and
logic control means for controlling said electrical excitation means,
  with said controller means causing said electrical winding sets to be excited selectively, always having at least two sets excited,
  said selective excitation being effective to cause, between two adjacent pairs of alignable stator and rotor tooth portions, magnetomotive force from one ring-mounted winding in one set to cooperate and combine with that from one or more ring-mounted windings in other sets to produce a magnetic flux, and
  cause said flux, as generated by said cooperating windings located between two alignable pairs of rotor and stator tooth portions, to combine with similar flux generated in like manner by other cooperating windings mounted between a next adjacent pair of alignable rotor and stator tooth portions,
  said other windings mounted between the next adjacent pair of alignable tooth portions comprising windings which are in the same sets as the windings between the original pair of alignable tooth portions,
  with said combination of fluxes being caused to take place in the stator tooth portion lying between said first cooperating windings and said second cooperating windings,
  said combining generating a magnetic pole in said tooth portion,
  there being a plurality of such magnetic poles evenly and symmetrically spaced around the periphery of said stator,
  said magnetic poles having alternating magnetic polarity between one pole and the next at any instant, and
  with the phase relation between said plurality of magnetic poles and said stator tooth portions being changeable in sequential rotational steps at succeeding instances,
  by means of said controller means causing different combinations of said winding sets to be excited,
  said rotational change of pole and tooth portion phase relation being effective to induce rotational torque upon said rotor member.

5. A stepping motor system comprising:
a stepping motor device including:
- a stator member having a plurality of evenly-spaced inwardly-extending attached tooth portions,
- a rotor member having a plurality of evenly-spaced outwardly-extending attached tooth portions,
  the number of rotor and stator poles, $r$ and $s$ respectively, and the number of steps per revolution being related by the expression $$n = \left| \frac{sr}{s-r} \right|$$

with either $s$ or $r$ being larger as is indicated by the absolute value bars,
  with said stator and rotor member being composed of magnetic material,
  with said stator and said rotor teeth portions being of similar cross-sectional size and shape and being separated at their free ends by an air gap,
  said stator member comprising a unitary ring having electrical windings placed thereon one between each two stator tooth portions,
  said windings being divided into equally-sized groups containing one winding or a plurality of adjacent windings in each group,
  each of said groups being located within and bounded by the smallest angular arc subtending an alignable pair of rotor and stator tooth portions, and
  the total angular measure subtended by all of said groups being 360 degrees,
  said electrical windings having the similarly-located windings from each group connected together into sets so that each set comprises windings which are excited in unison and each set is excitable separately from each other set,
  each of said winding sets comprising a symmetrical, evenly-spaced arrangement of windings about the circumference of said stator member,
  with said electrical windings being magnetically coupled to said stator member and being capable of inducing magnetic flux therein;
electrical excitation means comprising a direct current electrical energy source and an array of switch members,
  one switch member for each of said winding sets, each of said switching members of said array being located electrically between said energy source and one of said winding sets;

a logic control means controlling said switching members, said control means causing said electrical winding sets to be excited selectively always having two or more sets excited, the number of excited sets being absolutely limited by the number of windings in one of said groups and the number of excited sets also being limited by the number of windings in one group which can have their magnetomotive forces combine and produce magnetic flux, without producing saturation in said stator member, the number of excited sets also being limited by the number of windings in one of said groups which are electrically connected so as to be of aiding magnetic polarity upon excitation from said direct current energy source, said selective excitation being effective to cause, within a group of windings, magnetomotive force from one winding in one excited set to combine with that from another winding in another excited set and generate a magnetic flux in said stator, said generated flux from one winding group and flux generated in the same manner by an adjacent winding group being combined together in the single stator tooth portion lying betwen said two winding groups and generating therein a primary pole, with the total number of said primary poles being equal to the number of said winding groups on said stator member, and with said primary poles being evenly spaced around the periphery of said stator in alternating magnetic polarity, with each consecutive two of said primary poles being separated by one or more of said stator tooth portions which do not have flux summed therein, said tooth portions comprising poles defined as minor poles, with the total number of said minor poles being equal to the difference between the total number of stator teeth portions and the number of said primary poles, said total number of minor poles being equally divided between each pair of said primary poles, with the phase relation between said evenly-spaced primary pole and said stator tooth portions being changeable in succeeding instances in one position rotational increments, said change of pole and tooth phase relation being achieved by means of exciting different combinations of electrical winding sets in each successive instance, each position of said primary and minor poles at each instance being effective to exert a force on said rotor member of said stepping motor, with said force being a rotational force when said primary stator poles act on rotor tooth portions slightly misaligned with said primary poles; and electrical coupling means comprising separate conductive paths for each of said winding sets for coupling said winding sets to said excitation source.

6. A stepping motor system as defined in claim 5 wherein in the expression $$n = \left| \frac{sr}{s-r} \right|$$

the number of stator poles, $s$, and the number of rotor poles, $r$, are each restricted to even integers and are not a whole number multiple of each other.

7. A stepping motor system as defined in claim 6 wherein:

said stepping motor rotor member comprises a source of magnetic flux and said electrical excitation means includes a second D.C. electrical energy source coupled through a second array of switch members to said motor winding sets, said second D.C. electrical energy source being coupled to said winding sets in opposite electrical polarity to that of said original electrical energy source, said second switch member for each winding set being closable only in mutually exclusive fashion with respect to said original switch member so that current may flow only from one of said electrical energy sources into said winding set at any instant, said two electrical energy source excitation means being operable to selectively reverse polarity of the magnetomotive force generated by each electrical winding, and said stepping motor device being operable by virture of the attractive force between dissimilarly polarized stator and rotor poles and the repulsive force between similarly polarized stator and rotor poles.

8. A stepping motor system as defined in claim 7 wherein said source of rotor magnetic flux is a permanent magnet.

9. A stepping motor system as defined in claim 5 wherein in the expression $$n = \left| \frac{sr}{s-r} \right|$$

the number of stator poles, $s$, and the number of rotor poles, $r$, are restricted to even integers but are permitted to be whole-number multiples of each other.

10. A stepping motor system as defined in claim 9 wherein:

said stepping motor rotor member comprises a source of magnetic flux and said electrical excitation means includes a second D.C. electrical energy source coupled through a second array of switch members to said motor winding sets, said second D.C. electrical energy source being coupled to said winding sets in opposite electrical polarity to that of said original electrical energy source, said second switch member for each winding set being closable only in mutually exclusive fashion with respect to said original switch member so that current may flow only from one of said electrical energy sources into said winding set at any instant, said two electrical energy source excitation means being operable to selectively reverse polarity of the magnetomotive force generated by each electrical winding, and said stepping motor device being operable by virtue of the attractive force between dissimilarly polarized stator and rotor poles and the repulsive force between similarly polarized stator and rotor poles.

11. A stepping motor system as defined in claim 10 wherein said source of rotor magnetic flux is a permanent magnet.

12. A stepping motor system as defined in claim 5 wherein in the expression $$n = \left| \frac{sr}{s-r} \right|$$

the number of stator poles, $s$, is permitted to assume odd integer values and the number of rotor poles, $r$, is restricted to even integer values.

13. A stepping motor system as defined in claim 12 wherein:

said stepping motor rotor member comprises a source of magnetic flux and said electrical excitation means includes a second D.C. electrical energy source
coupled through a second array of switch members to said motor winding sets,
said second D.C. electrical energy source being coupled to said winding sets in opposite electrical polarity to that of said original electrical energy source,
said second switch member for each winding set being closable only in mutually exclusive fashion with respect to said original switch member
so that
current may flow only from one of said electrical energy sources into said winding set at any instant,
said electrical energy source excitation means being operable to selectively reverse polarity of the magnetomotive force generated by each electrical winding, and
said stepping motor device being operable by virtue of the attractive force between dissimilarly polarized stator and rotor poles and the repulsive force between similarly polarized stator and rotor poles.

14. A stepping motor system as defined in claim 13 wherein said source of rotor magnetic flux is a permanent magnet.

15. A stepping motor system including:
a stepping motor device including:
> a stator member having twelve evenly-spaced attached tooth portions and
> a rotor member having eight evenly-spaced attached tooth portions,
> said stator and rotor members being composed of magnetically conductive but non-magnetizable material,
> with said stator and said rotor tooth portions being of similar cross-sectional size and shape and being separated at their free ends by an air gap,
> said stator member comprising a unitary ring and having twelve electrical windings placed thereon, one between each two stator tooth portions,
> said electrical windings being divided into four groups of three adjacent windings,
> each of said electrical windings also having one winding from each of said four groups connected together so that said four windings called a first set may be excited in unison,
> said electrical windings also having another one winding from each group connected together into a second set and likewise the remaining winding from each group connected together into a third set,
> each of said sets of electrical windings being composed of windings similarly located within each of said four groups,
> each of said sets of electrical windings comprising a symmetrical, evenly-spaced pattern of windings about the circumference of said stator member,
> with each of said groups of windings being composed of two windings connected to have current flow in the positive sense, operated by one reverse-connected winding, so that a positive-connected winding in one group in every instance lies adjacent to a positive-connected winding in the adjacent group,
> thereby denoting that the first of said sets of windings and the third of said sets of windings are positive sets while the second set is a negative set,
> with said electrical windings being magnetically coupled to said stator member and being capable of inducing therein magnetic flux;
electrical excitation means comprising a direct current electrical energy source, and three switching members,
> with each of said three switching members being connected respectively between said energy source and one of said winding sets;
logic control means for controlling said electrical excitation means,
> with said logic control means causing said electrical winding sets to be excited selectively always two sets excited and one set non-excited,
> thereby denoting that, in each group of windings, two windings are excited and one winding is non-excited at each moment of time,
> said selective excitation of winding sets being effective to cause, in one group, magnetomotive force from one winding in one excited set to combine with that from another winding in the other excited set and generate a magnetic flux in said stator,
> said two excited windings being in the first instance two windings within one of said defined groups of windings and being separated by said non-excited winding of that same group,
> said generated flux from one winding group and flux generated in the same manner by an adjacent winding group being combined in the single stator tooth portion lying between said two winding groups,
> said magnetic flux combination generating a primary magnetic pole in said tooth portion,
> said excitation of two sets of stator windings and addition of magnetomotive forces and magnetic flux combination being effective to generate in the total stator member four of said primary magnetic poles,
> said primary magnetic poles being evenly spaced around the periphery of said stator in alternating magnetic polarity,
> each consecutive two of said primary magnetic poles being separated by two of said stator tooth portions not having flux combined therein, said tooth portions comprising minor magnetic poles,
> the phase relation between said four evenly-spaced primary poles and said stator tooth portions being changeable away from the first position in the second instance and in the third and succeeding instances,
> said change of magnetic pole and stator tooth portion phase relation being achieved by said logic control means causing excitation of different combinations of two electrical winding sets in each successive instance and without the need for bi-directional current flow in any electrical winding,
> each position of said primary and minor magnetic poles at each instance being effective to exert a force on said rotor member of said stepping motor,
> with said force being a rotational force when said stator primary magnetic poles act on rotor tooth portions slightly misaligned with said primary stator magnetic poles,
> with said force resulting from a propensity to minimize magnetic path reluctance through said misaligned stator and rotor members,
> said change of magnetic pole and stator tooth portion phase relation being achieved while maintaining, always the same, the polarity assumed by each stator tooth in its turn as a primary magnetic pole,
> rotation of stator primary and minor magnetic poles being accomplished in one-position increments and with the attending exertion of rotational force on said rotor member being continuable indefinitely in either clockwise or counter-clockwise direction by continued selective excitation of two sets of said stator windings under control of said logic control means;

and electrical coupling means comprising four conductive paths for coupling each of said winding sets and a point common to all winding sets to said excitation source.

References Cited

UNITED STATES PATENTS

| | | | |
|---|---|---|---|
| 3,041,516 | 6/1962 | Bailey | 310—49 X |
| 3,239,738 | 3/1966 | Welch | 318—138 |
| 3,324,369 | 6/1967 | Markakis | 318—138 |
| 3,344,325 | 9/1967 | Sklaroff | 318—138 |
| 3,361,953 | 1/1968 | Neval | 310—180 X |
| 3,412,302 | 11/1968 | Vercellotti | 310—138 |

WARREN E. RAY, Primary Examiner

U.S. Cl. X.R.

310—49, 156, 180